United States Patent
Cases et al.

(10) Patent No.: US 8,510,278 B2
(45) Date of Patent: Aug. 13, 2013

(54) METHOD OF LOADING A DATABASE ON BOARD AN AIRCRAFT

(75) Inventors: Fabien Cases, Toulouse (FR); Nicolas Fabas, Castelmaurou (FR); Christine Gris, Toulouse (FR); Jerome Treanton, Toulouse (FR)

(73) Assignee: Airbus Operations, Toulouse (FR)

( * ) Notice: Subject to any disclaimer, the term of this patent is extended or adjusted under 35 U.S.C. 154(b) by 197 days.

(21) Appl. No.: 12/756,538

(22) Filed: Apr. 8, 2010

(65) Prior Publication Data
US 2010/0268698 A1    Oct. 21, 2010

(30) Foreign Application Priority Data
Apr. 15, 2009 (FR) .................. 09 52456

(51) Int. Cl.
*G06F 17/00* (2006.01)
(52) U.S. Cl.
USPC ................................ 707/695
(58) Field of Classification Search
USPC .............................. 707/685, 695
See application file for complete search history.

(56) References Cited

U.S. PATENT DOCUMENTS

| | | | | |
|---|---|---|---|---|
| 4,619,110 A | * | 10/1986 | Moore | 60/39.091 |
| 5,056,086 A | * | 10/1991 | Libonati | 370/259 |
| 7,262,713 B1 | * | 8/2007 | Vogl et al. | 707/999.104 |
| 2005/0021518 A1 | * | 1/2005 | Snowdon et al. | 707/7 |
| 2008/0140267 A1 | * | 6/2008 | Matuska et al. | 701/3 |
| 2008/0154439 A1 | * | 6/2008 | Mira | 701/2 |
| 2008/0284618 A1 | | 11/2008 | Fabas et al. | |
| 2009/0049440 A1 | | 2/2009 | Lankes et al. | |
| 2009/0182764 A1 | * | 7/2009 | Subelet et al. | 707/102 |
| 2010/0088270 A1 | * | 4/2010 | Ziegler | 707/609 |

FOREIGN PATENT DOCUMENTS

DE   101 48 605 A1   4/2003
FR   2 915 292   10/2008

OTHER PUBLICATIONS

"Deploying Microsoft Software Update Services," Microsoft Corporation, Jan. 2003, http://download.microsoft.com.
Search Report issued in corresponding French Patent Application No. 0952456, completed Nov. 17, 2009.

* cited by examiner

*Primary Examiner* — Wilson Lee
*Assistant Examiner* — Thuy Bui
(74) *Attorney, Agent, or Firm* — Oliff & Berridge, PLC

(57) ABSTRACT

In the method of loading data on board an aircraft), a data set is loaded into on-board equipment of the aircraft, the data set comprising at least:
a first version of a database that is identical to a version already in use in the aircraft; and
a second version of the database.

The database preferably relates to an aircraft warning system.

9 Claims, 3 Drawing Sheets

METHOD OF LOADING A DATABASE ON BOARD AN AIRCRAFT

FIELD OF THE INVENTION

The invention relates to loading data on board aircraft.

The invention relates in particular to updating the contents of written procedures managed by the warning system that is generally present on an airplane. In certain aircraft, the system is referred to as a flight warning computer (FWC) or as a flight warning application (FWA). Herein it is referred to as a flight warning system (FWS).

These written procedures are to be followed by the crew and they are of various types. They may be check lists, abnormal procedures, or indeed supplementary procedures. Abnormal procedures are those for implementing in the event of a warning. Supplementary procedures are those implemented under circumstances that are exceptional, but nevertheless not warning circumstances (e.g. very cold weather).

These written procedures are defined in a database used by the warning system. By way of example, the database is that provided by the manufacturer before delivering the aircraft.

Nevertheless, the operator of the aircraft may desire to apply different procedures, e.g. to modify the wording of the messages provided in check lists. For this purpose, it is known to replace certain default messages by other messages. Specifically, these modifications are made available to the crew on board by means of a paper document that the crew needs to consult when certain procedures are to be applied. Such a document is known for example as the flight crew operating manual (FCOM).

BACKGROUND OF THE INVENTION

Document FR-A-2 915 292 discloses another method of modifying the written procedures of the database. In that method, the operator creates an electronic database relating to the alterations it seeks to make to the written procedures and it loads the database into the warning system. When a procedure is to be applied, the system consults the database and gives priority to the procedure as modified thereby. If there is no such modification, then by default it applies the procedure as provided in the manufacturer's database. The term "customized" database is used herein to designate the database that provides the personalization desired by the operator of the aircraft. By way of example, such a database is known as an operator customized ECAM database (OCED), where the acronym ECAM stands for electronic centralized aircraft monitoring. (ECAM is a set of visible and audible information systems and monitoring systems in the environment of an aircraft cockpit.) The database as loaded in this way provides changes compared with the written messages that are defined by default in the application. It thus constitutes a relative database.

Under such conditions, it is possible to modify the content of any written message that is to be displayed in the cockpit by the warning computer, and this can be done without requiring a specific standard to be developed. By using the customization database that is loaded in the warning system, the warning system becomes capable of modifying the content of the written messages that it handles.

Such a database may also be issued by the manufacturer, e.g. when seeking to provide modifications or improvements to the database as originally loaded, e.g. in the presence of a new standard for the warning software.

The customization database is produced by means of a dedicated tool. It is then loaded into the hardware device known as the core processing and input/output module (CPIOM) that hosts the warning system application.

The operator customization database has an applicability date. It is from this date that the modified procedures are to be implemented. However, once installed on board an aircraft in the target CPIOM, the new database is taken into account immediately by the warning system. Ideally, the new database should therefore be installed in all of the airplanes on the fleet on the applicability date.

It will nevertheless be understood that it is not possible for an operator possessing a large fleet to achieve synchronized updating over the entire fleet. The airplanes of the fleet are geographically dispersed on the applicability date for the new database. Furthermore, the updating of each airplane gives rise to immobilization costs. The database needs to be loaded into the CPIOM. This procedure for installing the new database on board does not form part of the competence of a pilot. The database must therefore be loaded by maintenance personnel. The operator thus prefers loading the database at the time of a programmed maintenance stage. However, the program maintenance date does not necessarily correspond to the applicability date of the new database. Unfortunately, when the airplanes in the fleet are updated and the new procedure is applied on different dates, that gives rise to coordination and management difficulties, in particular in terms of informing and training crew.

OBJECT AND SUMMARY OF THE INVENTION

An object of the invention is to mitigate those drawbacks so as to facilitate modifying the databases that are taken into account on board aircraft.

To this end, the invention provides a method of loading data on board an aircraft, wherein a data set is loaded into on-board equipment of the aircraft, which data set comprises at least:
 a first version of a database that is identical to a version already in use in the aircraft; and
 a second version of the database;
 the database preferably relating to a warning system of the aircraft.

Thus, a double database is provided incorporating the version that is already applied by all of the fleet together with the version having its applicability date in the future. Each of these two versions, e.g. customizations, can thus be characterized by its own applicability date that is recognizable by the warning system that is to use it. The data set having the two databases may be loaded over a period of time into all of the aircraft of the fleet. Provision can thus be made for the version that is active to be the same over the entire fleet up to the transition date, up to which date the other version, referred to as the secondary or dormant version remains inactive. On the transition date, the second version can be come active and the earlier version inactive.

This solves the problem of installing the new database in a manner that is spread out over time. This progressive installation in the fleet is compatible with putting the new version of the database into application at the same time for the entire fleet.

In addition, when the new version is to be used, there is no longer any question of loading it on board, but merely of activating it. This in an operation that can be carried out without difficulty by a pilot or that may indeed be triggered automatically. There is therefore no need for maintenance personnel to be involved. The invention thus enables the operator to achieve coordinated updating of its electronic written procedures over its entire fleet at a specified date regardless of the geographical location of each aircraft in the fleet at that date.

It can be seen that the invention makes it possible to separate actual loading of the new version of a database and the activation thereof, and to take advantage of this separated implementation of these two operations.

Furthermore, the data set comprising two databases as implemented in the invention involves managing only one component number on board, thereby avoiding any increase in the quantity of such numbers, which is already very high for an aircraft.

Preferably, parameter settings are made suitable for causing a predetermined one of the two versions to be taken into account by a computer of the airplane, in particular the first version, e.g. by storing an identifier of said version in a non-volatile memory of the aircraft.

Thus, the computer is in a position to identify which of the two versions it is to use, e.g. on being restarted.

The invention also provides a computer program presenting code instructions suitable for controlling execution of steps of the loading method of the invention when executed on a computer.

The invention also provides a data storage medium that includes such a program in recorded form.

The invention also provides making such a program available on a telecommunications network for downloading.

The invention also provides an aircraft having on-board equipment including at least:
- a first version of a database that is identical to a version already in use in the aircraft; and
- a second version of the database;

the database preferably relating to a warning system of the aircraft.

Preferably, the aircraft includes on-board means, in particular a man-machine interface, for setting parameters suitable for causing the second version to be taken into account by a computer of the aircraft.

Thus, the changeover from one version to the other can be triggered by a person on board, e.g. a member of the crew.

Advantageously, the aircraft includes automatic means for acting on the occurrence of a predetermined event and without human intervention, e.g. the arrival of a predetermined date, to set parameters suitable for causing the second version to be taken into account by a computer of the aircraft.

Thus, there is no need to provide for human intervention in order to perform the changeover. This thus makes it possible to achieve suitably synchronized changeover from one version to the other over the entire fleet.

The invention also provides a method of controlling an aircraft of the invention, wherein, for the aircraft having parameters set to cause a computer of the aircraft to take account of the first version, its parameters are changed so as to cause the second version to be taken into account by the computer.

The invention also provides a computer program presenting code instructions suitable for controlling execution of the steps of the control method of the invention when executed on a computer.

The invention also provides a data storage medium including such a program in recorded form.

The invention also provides making such a program available on a telecommunications network for downloading.

The invention also provides a data storage method, wherein a data set is stored on a medium, the data set comprising at least:

a first version of a database that is identical to a version already in use by on-board equipment of an aircraft; and
a second version of the database;

the database preferably relating to a warning system of the aircraft.

The invention also provides a computer program including code instructions for controlling execution of the storage method of the invention when executed on a computer.

The invention also provides a data set comprising at least:
- a first version of a database that is identical to a version already in use by on-board equipment of an aircraft; and
- a second version of the database;

the database preferably relating to a warning system of the aircraft.

The invention also provides a data storage medium that includes at least one data set of the invention in recorded form.

The invention also provides a method of making a data set available on a telecommunications network for downloading, wherein the data set is in accordance with the invention.

BRIEF DESCRIPTION OF THE DRAWINGS

Other characteristics and advantages of the invention appear further from the following description of an embodiment given by way of non-limiting example and with reference to the accompanying drawings, in which.

MORE DETAILED DESCRIPTION

Figure 1:
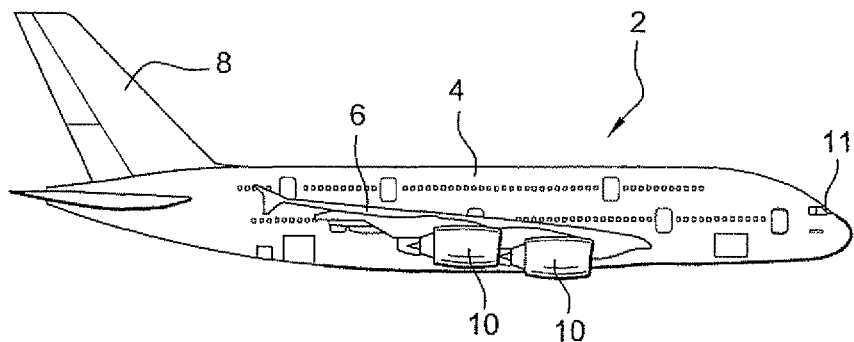
FIG. 1 is a side view of an airplane of the invention.
Figure 2:
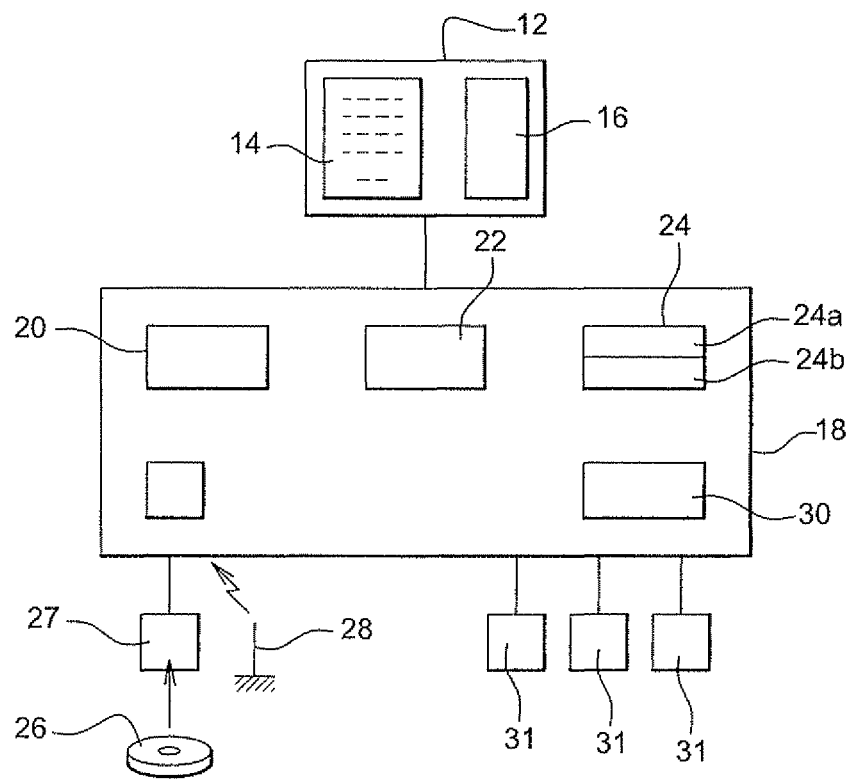
FIG. 2 is a diagram of the warning system of the FIG. 1 airplane.

FIG. 1 shows an aircraft 2 of the invention. This aircraft is specifically an aerodyne and here it is constituted by an airplane. The airplane comprises a fuselage 4, two wings 6, a tail fin 8, and engines 10, there being four engines in this example.

The airplane 2 has a cockpit 11 from which the pilot controls the airplane. The equipment of the airplane includes display means 12 of the ECAM type, together with a control unit, e.g. of the ECAM control panel (ECP) type. This unit includes in particular control members and a keyboard.

The airplane includes a warning system 18 of the FWS type. The system 18 is centralized and connected to numerous other computers of the airplane, and its mission is to inform the pilot in the event of a dangerous configuration occurring. In the present example, the system 18 is shown as being connected to only three computers 31.

In the event of a warning, the system 18 displays on a screen 14 for reading by the pilot: the title of the warning concerned; the procedure to be followed together with the operations to be performed; and the current status of the airplane. There exist very many types of warnings. For example, there is a warning when the system 18 detects that an undercarriage is not extended while the airplane is making an approach. Another example is the occurrence of a fire in an engine.

The system 18 is hosted in a device of the CPIOM type that includes in particular at least a central unit together with one or more memories. The system 18 comes under chapter 31 of the Air Transport Association (ATA).

The system is controlled by a program 20 constituted by operational software. The computer program implements at least some of the steps of the method of the invention, as explained below.

The system 18 also has a manufacturer's database 22. This database contains in particular the data that is used by default by the program 20 for implementing electronic written procedures (check lists, abnormal procedures, supplementary procedures).

The system 18 also has a data set 24. This data set comprises two databases that are specifically customization databases of the operator of the aircraft. In the present example, it comprises two versions 24a and 24b of the operator customization database, these versions being different from each other. The version 24b is typically an improvement over the version 24a. The software 20 incorporates a customization function that enables it, as a function of information provided in the active version 24a and 24b, to modify at least some of the written messages defined by default in the standard of the database 22, when issuing them.

The software and the data 22 and 24 are stored in memories of the system 18. The software, the database 22, and the data set 24 constitute respective elements suitable for being loaded on board. (Nevertheless, provision is preferably made for the database 22 to form an integral portion of the software 20.) Each element may be replaced on board by a modified or updated version of the same element. This operation is carried out by maintenance personnel. For example, it is performed using a permanent or removable data recording medium 26 such as a CD-ROM or DVD-ROM disk, a flash memory device such as a USB key, or a hard disk device such as a repository. For example, loading may be performed by inserting a CD 26 into a on-board computer 27 of the airplane that serves to load data on board. The computer reads the contents of the disk 26 and sends the corresponding element(s) to the CPIOM hosting the FWS 18. In a variant, the modified element may be loaded remotely via a wireless connection, in the form of a download from a telecommunications network 28.

In the present example, the set 24 thus incorporates two customization databases 24a and 24b. Each of these databases has its own applicability. It is identified by means of a numerical identifier code. Nevertheless, in a variant, it is possible to provide for the code to be constituted by the applicability date, e.g. "20090521" if the applicability date is May 21, 2009. After the databases have been loaded into the CPIOM module hosting the warning system, the numerical identifier of the version 24a or 24b of the database that is to be applied is recorded in a non-volatile memory 30 of the system 18. When the system restarts, the software can thus determine which of the versions is to be applied.

The means 12 form a man-machine interface comprising the screen 14 that is used by the pilot to be informed about the status of the airplane and to take cognizance of normal or abnormal procedures that are to be applied. In this example, this interface is dedicated to this function. It also enables the pilot to determine the applicability dates of the active and the dormant customizations respectively (for the dormant customization date, the applicability date is in the future). This interface also enables the pilot, when the time comes, to swap one of the versions for the other as the active database.

Various aspects of the method of the invention and the steps thereof are described below with reference to FIGS. 3 to 8.

Figure 4:
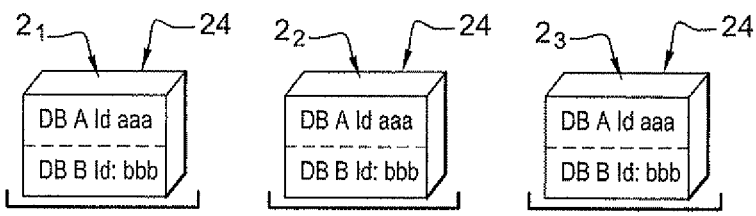
FIGS. 4 to 8 are diagrams providing additional information for some of the steps of the FIG. 3 method.

With reference to FIG. 4, it is assumed that each airplane 2 in a fleet has a data set 24 within its alarm system 18. This data set includes two versions 24a and 24b of the databases respectively named "DB A" and "DB B". These two version have respective identifiers "aaa" and "bbb". With reference to FIG. 4, consideration is given to three respective airplanes 2.1, 2.2, and 2.3 in the fleet, and it can be seen that at one particular instant, these three airplanes have identical data sets 24. The elements 20 and 22 are also the same in all three airplanes. In addition, in the starting situation under consideration, it is the version DB B of the customization database of the operator that is active in the alarm system 18. In particular, the reference "bbb" is stored in the non-volatile memory 30 of the system so that, in the event of the system needing to be restarted, it takes account of this version as being the active version.

Figure 3:
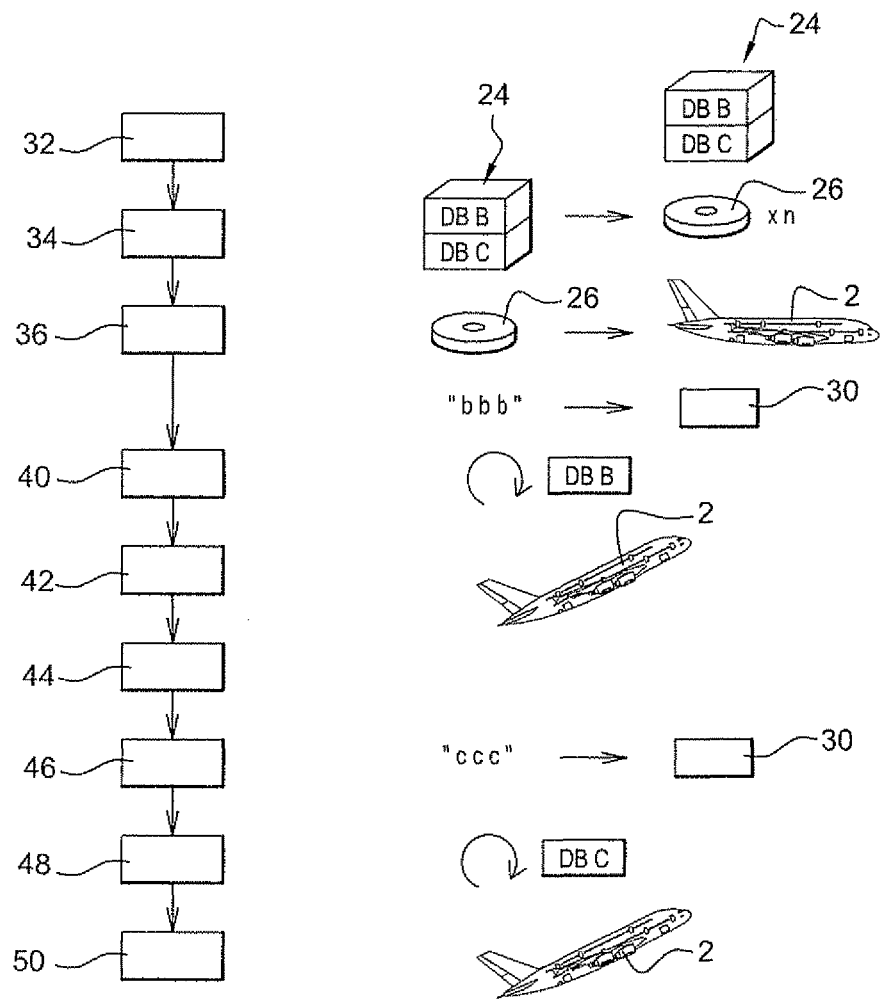
FIG. 3 is a flow chart showing the steps implemented in the method of the invention in association with the airplane of FIG. 1.

In step 32 in FIG. 3, the operator design office 33 develops a new version of the customization database, which version is referred to herein as "DB C" and it has the identifier "ccc".

Figure 5:
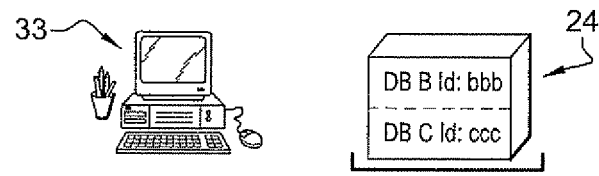

The design office produces a new data set 24 comprising the versions DB B and DB C of the database, as shown in FIG. 5. This new data set 24 is given a new reference number "xxxx". This data set thus comprises the version of the customization database that is presently being taken into account on all of the airplanes of the fleet, and a new version of the customization database having an applicability date that is in the future. This version is different from the version presently in use, and it preferably constitutes an update. For each of the two versions, the data set 24 has an applicability date and a numerical identifier.

During a step 34, this data set is recorded on a mass-produced data recording medium 26 such as disk. In the variant concerning on-board downloading, the data set 24 is made available on a telecommunications network for downloading.

In step 36, for one airplane of the fleet, maintenance personnel inserts the media 26 on board and loads the data set 24 into the computer 27. The computer sends this data set to the system 18 with it then being stored in the memory thereof. The versions DB B and DB C are thus loaded in the warning computer. The preceding data set with its versions DB A and DB B is overwritten. During this loading, the identifier of the version to be used as stored in the memory 30 remains unchanged. Specifically, it is the identifier "bbb".

In the following step 40, the airplane computers, and in particular the warning system 18, are restarted. Taking account of the identifier stored in the memory 30, the warning system takes account of the version DB B of the customization database. Thus, after loading and restarting, the warning system 18 continues to operate with a version of the customization database that is identical to that which it was using prior to loading and restarting. This loading operation is therefore transparent from an operational point of view. In particular, during subsequent use of the airplane in step 42, and in particular while it is in flight, the system 18 uses the database DB B.

Figure 6:
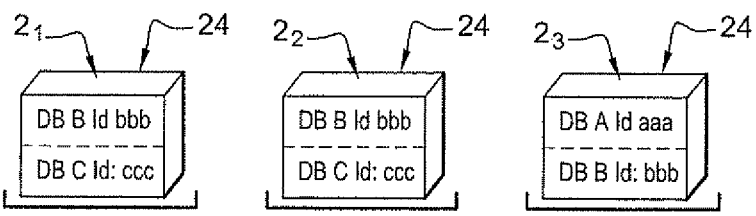

A certain amount of time is allocated to maintenance personnel for loading the data set 24 in this way into all of the fleet. In particular, it is allowable for loading to take place on different dates for different respective airplanes. In particular, it is possible to wait for an airplane to return for maintenance before performing the loading operation. Thus, FIG. 6 shows the state of the fleet when the loading operation has been performed with only some of the airplanes in the fleet. Thus, the airplanes 2.1 and 2.2 have received the new data set 24, but the airplane 2.3 has not yet received it. At that particular time, it is the database DB B that is used in all of them.

Figure 7:
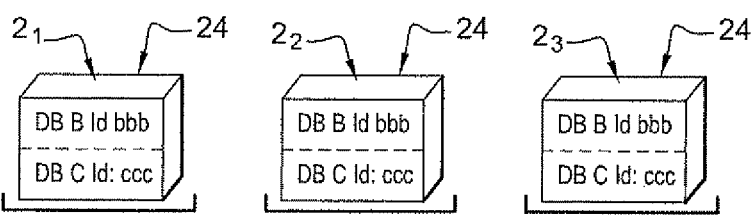

FIG. 7 shows the state of the fleet after step 42 has been reached for all of the airplanes. At this stage, all of the airplanes have received the new data set 24, but all of them are still using version DB B. It can thus be seen that in spite of the new version DB C being loaded on board, it is still the version DB B, which is still present on board, that continues to be taken into account.

In step 44, the applicability date of version DB C arrives. The pilot is warned by the interface 12. This enables the pilot to cause the system 18 to exchange the two versions. More precisely, this consists in the system 18 ceasing to take account of the version DB B and instead taking account of the version DB C. In a variant, provision could be made for the system 18 or some other device to detect the arrival of the applicability date of the version DB C and to cause the new version to be taken automatically into account without any need for the pilot to issue a command for this purpose. Thus, the databases may be exchanged automatically if the computer makes use of its knowledge of the UTC date.

In step 46, this command specifically sets parameters by inputting into the non-volatile memory 30 the reference "ccc" of the version DB C instead of and replacing the reference "bbb".

Figure 8:
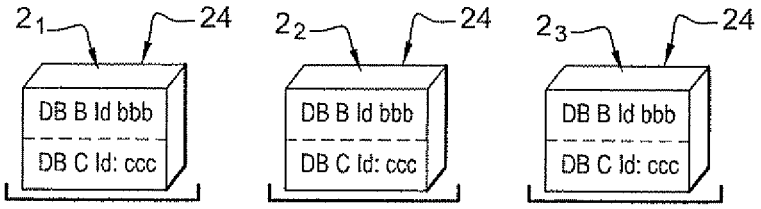

In step 48, the computers restart, preferably automatically, and the system 18 now takes account no longer of the database DB B, but of the database DB C, given that it is its reference that is contained in the memory 30. The system 18 thus applies the new customization when the airplane is used, as indicated in step 50. FIG. 8 shows the situation of the fleet once step 50 has been reached by all of the airplanes. The changeover from one version to the other can thus take place for the entire fleet over a very short period, i.e. almost simultaneously. The versions present on board are not changed, but now it is the version DB C of the customization database that is active and not the version DB B.

All or part of the method of the invention may be controlled by means of a computer program. The program comprises code instructions suitable for causing all or some of the steps of the method to be executed when the program is executed on a computer. This program may be recorded on a data medium such as a CD, a DVD, or a flash memory device. The program may be made available on a telecommunications network for downloading.

It can be seen that the invention enables the new version of the customization database to be installed over an entire fleet, in a progressive manner while subsequently enabling activation of the new version to take place over the entire fleet during a period that is very short. For example, provision could be made for the new data set 24 to be loaded into the entire fleet over a period of several months, with the new version then being activated over the entire fleet during a single day.

The invention implies managing only one component reference for the data set having two versions of the customization database.

The operation of exchanging version in terms of active version may be performed by the pilot directly without intervention by maintenance personnel.

Naturally, numerous modifications may be made to the invention without going beyond the ambit thereof.

Provision may be made for the data set to have three or more versions of the database.

The database may relate to a system other than a warning system or to data other than written procedure data, e.g. it may relate to the audible signals of warnings.

Provision may be made for the databases to be stored on board in equipment other than the alarm system 18, providing the databases are accessible thereto.

The customization database may be a database from the airplane manufacturer. Provision may be made for the airplane to operate simultaneously with a manufacturer customization database and with an operator customization database.

The invention may be used in the rail transport field, e.g. in a train, or in the nuclear power field, e.g. within a nuclear power station.

What is claimed is:

1. A method of loading data on board at least one aircraft, wherein a data set is loaded into on-board equipment of the at least one aircraft, which data set comprises at least:
   a first version of a database that is identical to a version already in use in the at least one aircraft;
   a second version of the database,
   wherein the first and second versions of the database are each characterized by an applicability date that indicates when each version can become active; and
   a warning system for the at least one aircraft which recognizes which version or versions of the database to use based upon the applicability dates,
   wherein parameter settings are made suitable for causing a predetermined one of the two versions to be taken into account by a computer of the airplane,
   wherein the first version is swapped for the second version or the second version is swapped for the first version based upon the applicability date of one or more of the versions, and
   wherein the data set is loaded into on-board equipment of a second aircraft, and the warning system for each aircraft recognizes, after the data set is loaded into the on-board equipment of each aircraft, which version or versions of the database to use based upon the applicability dates.

2. A method according to the claim 1, wherein the settings are made by storing an identifier of said version in a non-volatile memory of the aircraft.

3. An aircraft, including a data set that is loaded into on-board equipment including at least:
   a first version of a database that is identical to a version already in use in the aircraft;
   a second version of the database,
   wherein the first and second versions of the database are each characterized by an applicability date that indicates when each version can become active;
   a warning system for an aircraft which recognizes which version or versions of the database to use based upon the applicability dates; and
   wherein the on-board equipment sets parameters suitable for causing the second version to be taken into account by a computer of the aircraft,
   wherein the first version is swapped for the second version or the second version is swapped for the first version based upon the applicability date of one or more of the versions, and
   wherein the data set is loaded into on-board equipment of a second aircraft, and the warning system for each aircraft recognizes, after the data set is loaded into the on-board equipment of each aircraft, which version or versions of the database to use based upon the applicability dates.

4. An aircraft according to claim 3, including automatic means for acting on the occurrence of a predetermined event without human intervention, to set parameters suitable for causing the second version to be taken into account by a computer of the aircraft.

5. A method of controlling an aircraft, wherein the aircraft is the aircraft of claim 3, and wherein, for the aircraft having parameters set to cause a computer of the aircraft to take account of the first version, its parameters are changed so as to cause the second version to be taken into account by the computer.

6. A data storage method, wherein a data set is stored on a memory, the data set comprising at least:
   a first version of a database that is identical to a version already in use by on-board equipment of an aircraft; and
   a second version of the database,
   wherein the first and second versions of the database are each characterized by an applicability date that indicates when each version can become active; and
   a warning system for an aircraft which recognizes which version or versions of the database to use based upon the applicability dates,
   wherein parameter settings are made suitable for causing a predetermined one of the two versions to be taken into account by a computer of the airplane,
   wherein the first version is swapped for the second version or the second version is swapped for the first version based upon the applicability date of one or more of the versions, and
   wherein the data set is loaded into on-board equipment of a second aircraft, and the warning system for each aircraft recognizes, after the data set is loaded into the on-board equipment of each aircraft, which version or versions of the database to use based upon the applicability dates.

7. A method of making a data set available on a telecommunications network for downloading, wherein the data set is in accordance with claim 6.

8. A non-transitory data storage medium, including, in recorded form, at least one data set comprising at least:
   a first version of a database that is identical to a version already in use by on-board equipment of an aircraft; and
   a second version of the database,
   wherein:
      the first and second versions of the database are each characterized by an applicability date that indicates when each version can become active,
      a warning system for an aircraft recognizes which version or versions of the database to use based upon the applicability dates,
      parameter settings are made suitable for causing a predetermined one of the two versions to be taken into account by a computer of the airplane,
      the first version is swapped for the second version or the second version is swapped for the first version based upon the applicability date of one or more of the versions, and
      the data set is loaded into on-board equipment of a second aircraft, and the warning system for each aircraft recognizes, after the data set is loaded into the on-board equipment of each aircraft, which version or versions of the database to use based upon the applicability dates.

9. A method for displaying a customized message on an aircraft, comprising:
   loading data on board an aircraft, wherein a data set is loaded into on-board equipment of the aircraft, which data set comprises at least:
   a first version of a database that is identical to a version already in use in the aircraft;
   a second version of the database,
   wherein:
      the first and second versions of the database are each characterized by an applicability date that indicates when each version can become active;
      the aircraft includes a warning system which recognizes which version or versions of the database to use based upon the applicability dates and further determines whether or not a warning should be displayed;
      parameter settings are made suitable for causing a predetermined one of the two versions to be taken into account by a computer of the airplane;
      the first version is swapped for the second version or the second version is swapped for the first version based upon the applicability date of one or more of the versions; and
      the data set is loaded into on-board equipment of a second aircraft, and the warning system for each aircraft recognizes, after the data set is loaded into the on-board equipment of each aircraft, which version or versions of the database to use based upon the applicability dates, and
   displaying, in the event the warning system determines the warning should be displayed, a customized message on a screen that indicates at least the warning concerned and the operations to be performed.

* * * * *